Feb. 27, 1968      D. W. VAN DOORN      3,370,327
APPARATUS FOR CLEANING LINT COTTON AND THE LIKE
Filed March 6, 1967      3 Sheets-Sheet 3
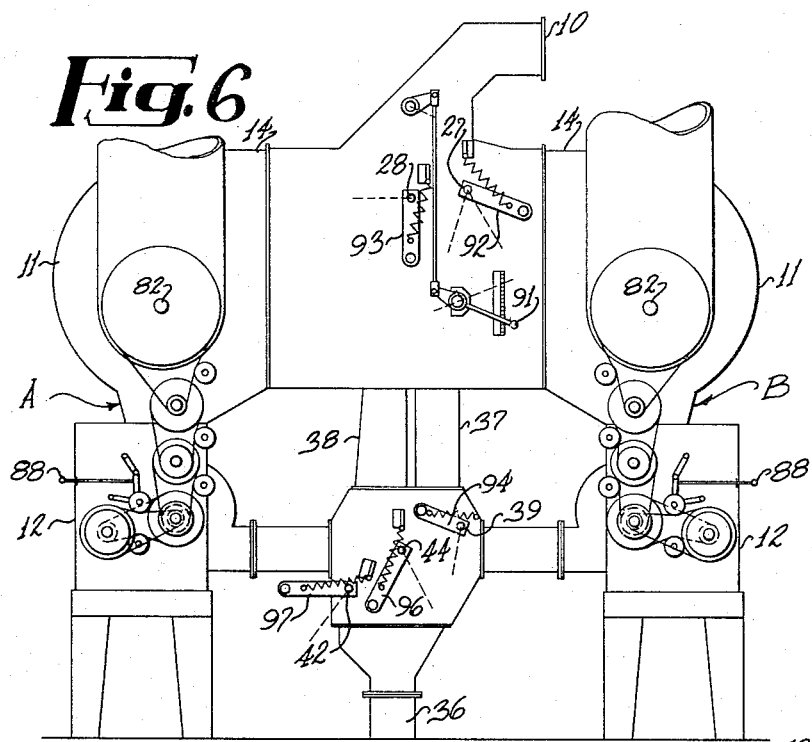
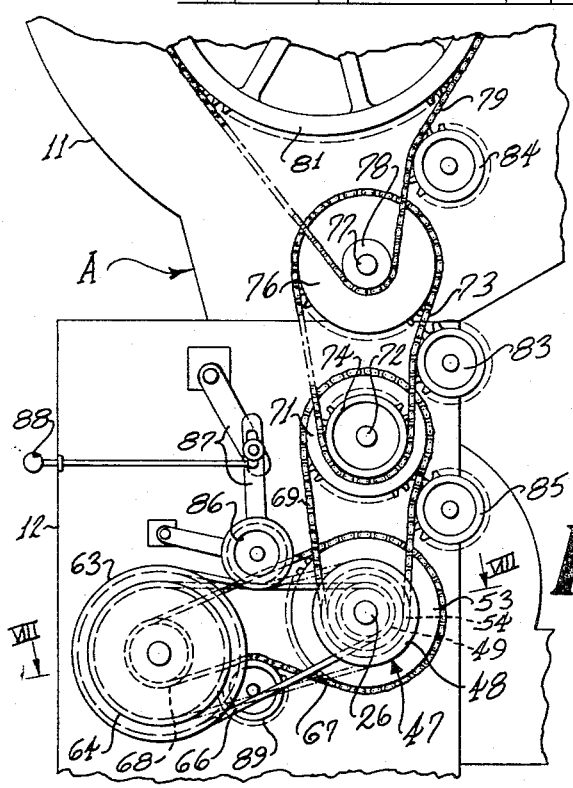
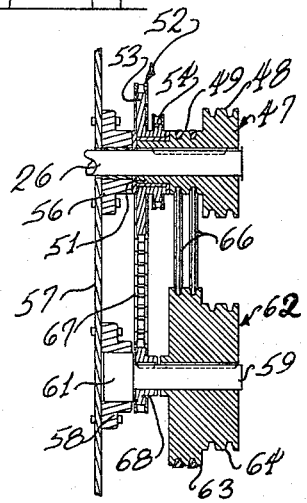
INVENTOR.
Donald W. VanDoorn
BY
Jennings Carter & Thompson
Attorneys

United States Patent Office 3,370,327
Patented Feb. 27, 1968

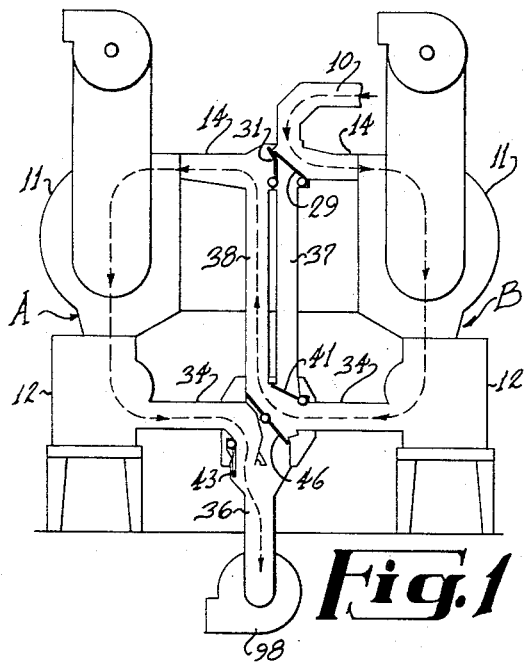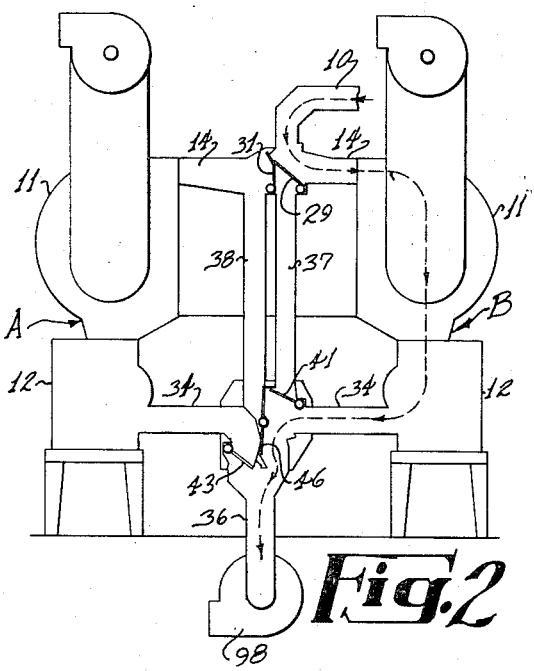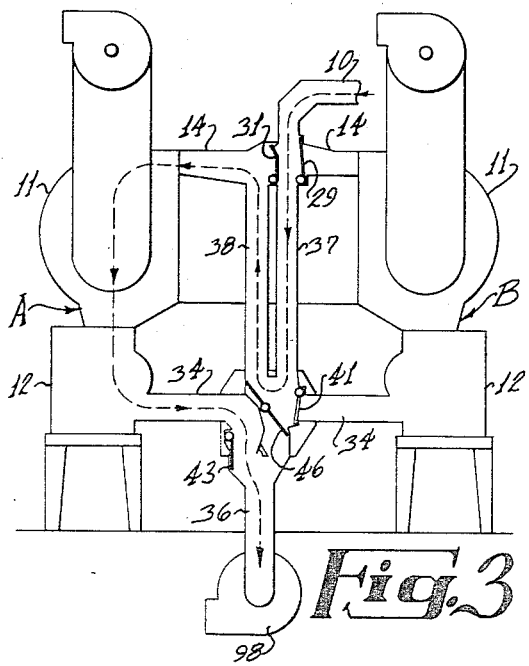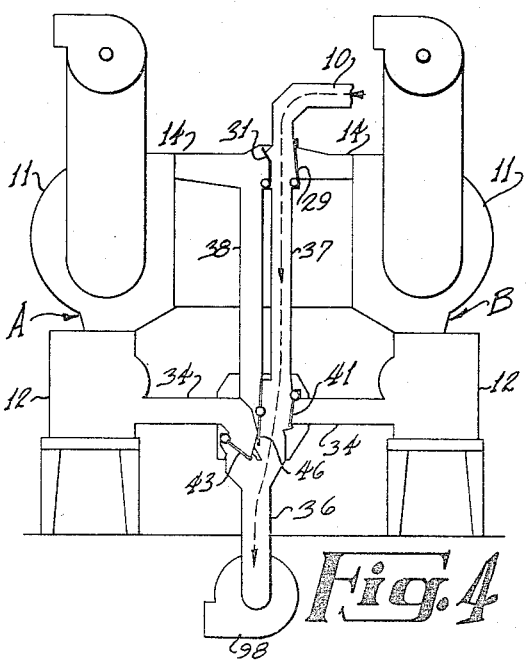

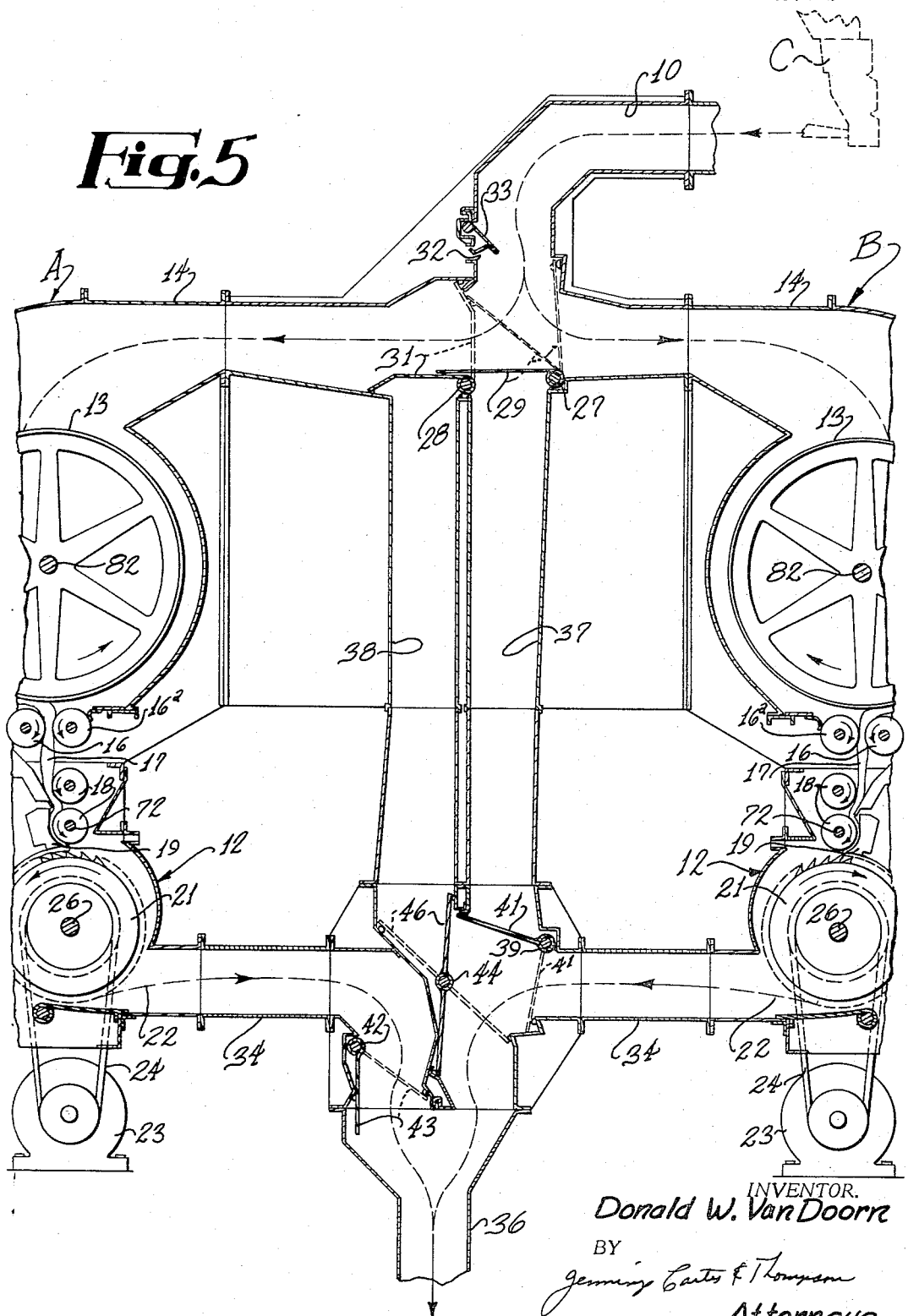

3,370,327
APPARATUS FOR CLEANING LINT
COTTON AND THE LIKE
Donald W. Van Doorn, Columbus, Ga., assignor to Lummus Cotton Gin Company, a corporation of Georgia
Filed Mar. 6, 1967, Ser. No. 620,895
6 Claims. (Cl. 19—205)

ABSTRACT OF THE DISCLOSURE

Apparatus designed for placement following cotton gins and which is effective to clean the lint cotton coming from the gins, said apparatus consisting essentially of two separate lint cleaners, and there being provided means for passing the cotton selectively through the cleaners either in tandem, or simultaneously, from the gin to both cleaners in substantially equal quantities, or all of the cotton from the gin through a selected one of the lint cleaners only or, to by-pass both lint cleaners completely.

In recent years there has been a steady trend of harvesting cotton containing more and more trash. This is due primarily to the ever increasing shortage of labor and the resulting development of machine harvesting systems which gather much trash, such as leaves, stems, hulls and stalks with the seed cotton. As a result of such dirty cotton, there has been increasing pressure on ginners to provide ginning equipment which will remove this trash from the cotton coming from the gin. The most effective machines to remove this type of foreign matter from seed cotton have proven to be lint cleaners which clean the cotton fiber or lint after the seed has been removed in the ginning process. At first, one stage of lint cleaners was introduced immediately following the gin and later, a second stage was introduced, and still later, in some cases, even three stages of lint cleaners are being used to remove the foreign matter from the ginned cotton. Recently, many tests conducted by government and independent research groups have shown that the use of saw type lint cleaners, these being the types predominantly used, result in a certain amount of fiber damage. Some textile mills requiring high quality cotton fiber, free of neps and with maximum staple length, have demanded that no more than one stage of saw type lint cleaners be used on the cotton purchased by them. However, since the average gin must gin cotton for the government loan and for a multitude of private cotton buyers, most of which buyers presently pay a premium for cleaner cotton rather than pay a premium for the preservation of staple length and reduction of neps, there is a need that the gins be able to gin cotton for maximum cleanliness for some customers and for maximum fiber quality at the sacrifice of cleanliness for other customers.

With the foregoing in mind I have developed and in this application disclose and claim a lint cleaner ducting and valving system by means of which two lint cleaners, preferably of the saw type, may be associated with the lint system in such fashion that the cotton may be operated upon selectively by the two lint cleaners. That is to say, by means of my invention the ginned cotton from a lint flue may be passed in tandem through the two lint cleaners, or, all of it through a selected one of the lint cleaners, or, the cotton may be divided substantially equally between the two lint cleaners or, both lint cleaners may be completely by-pased. In the case of passing the cotton through two saw type lint cleaners in tandem, I obtain maximum cleaning, but such working results in some fiber degradation. In the same system, by switching a few simple valves and shifting a quick change drive mechanism on the feed works, the system may be set up to split the lint cotton equally between the two lint cleaners. In this case each machine processes cotton at half the rate it would normally process the same when the machines are run in series, thereby accomplishing a much more effective cleaning job than can be accomplished if the cotton were passed through only one lint cleaner, by-passing the second one. Thus, in the case just mentioned the fiber degradation is held to a minimum by subjecting the cotton to only one stage of saw type lint cleaning and the trash content of the processed cotton is reduced compared to the use of one machine singlely. Furthermore, since the cotton is processed at half the normal rate when the split option is employed, the cotton is handled more gently and the fiber damage is reduced below that which would occur if one lint cleaner were used singlely and treated the fiber at twice the feed rate. Still further, whenever necessary or desired, by a simple setting of the valve arrangement both lint cleaners may be by-passed completely.

Apparatus illustrating features of my improved system is shown in the accompanying drawings forming a part of this application in which:

FIG. 1 is a diagrammatic view illustrating the passage of the cotton from the lint flue in tandem through two saw type lint cleaners;

FIG. 2 is a view similar to FIG. 1 and showing all of the lint cotton being passed over the righthandmost lint cleaner and none over the other;

FIG. 3 is a view similar to FIG. 1 showing all of the cotton being passed over the lefthandmost lint cleaner and none over the righthandmost one;

FIG. 4 is a view similar to FIG. 1 showing the cotton by-passing both lint cleaners;

FIG. 5 is an enlarged, fragmental detail sectional view illustrating the valve arrangement in which the cotton from the lint flue is being divided into two substantially equal streams and passed over both lint cleaners;

FIG. 6 is a side elevational view of the associated pair of lint cleaners and illustrating in diagrammatic form the drive and valve means therefor, the valves being set in the positions corresponding to FIG. 5;

FIG. 7 is a fragmental side elevational view of the drive and speed change mechanism for the lint cleaners; and, FIG. 8 is a detail sectional view taken generally along line VIII—VIII of FIG. 7.

Referring now to the drawings for a better understanding of my invention I show the same as embodying a pair of lint cleaners of the saw type and which are illustrated generally at A and B. As will be understood, the lint cleaners are mounted side by side, rearwardly of the gin stand or stands which is illustrated diagrammatically at C in FIG. 5, in position to receive from the gin stand or stands, as the case may be, the lint cotton which has been ginned by the gins and which is transferred to the lint cleaners through a lint flue 10.

As is understood in the art, each of the lint cleaners embodies a condenser 11, mounted over the lint cleaner proper indicated generally at 12. As also is understood, each condenser embodies a rotary foraminous drum 13 mounted in a suitable housing 14. The cotton is condensed on the drum and is removed therefrom at the lower surface by a pair of doffer rolls indicated at 16 and 16a. The bat of cotton thus condensed and removed is indicated in the drawings by the numeral 17 and this bat is fed downwardly by means of a pair of rolls 18, past a presser plate 19 and onto the periphery of a rotating saw cylinder 21. The bat of cotton may be doffed from the saw cylinder by means of an air stream which contacts the saw cylinder at its lower surface and removes the cotton as indicated by the dotted line 22, FIG. 5. As will be understood the saw cylinders are rotated in the direction of the arrows applied thereto, FIG. 5, by any suitable means such as electric motors 23 and the belt 24, which belt drives the saw cylinder shaft 26 and hence the saws mounted thereon.

The lint cleaning mechanisms so far described are common in the art and as such form no part of my invention. My invention comprises the valving and ducting arrangement for handling the lint and directing it as aforesaid, in the several patterns of flow relative to one or both of the lint cleaners. Furthermore, in combination with such valve means my invention contemplates means to change the speed of the feed works of the lint cleaners when the lint is being divided substantially equally between the two lint cleaners, thereby to maintain the optimum thicknesses of the cotton bats as they are fed onto the cleaning cylinders. By thus reducing the speed of the feed works to one-half that used with the tandem or single valve settings the cotton bats will be the same thickness in all valve settings.

Referring particularly to FIG. 5 it will be seen that the lint flue 10 delivers the lint from gin stand or stands to the housing 14 of each of the lint cleaners A or B. Pivotally mounted on shafts 27 and 28 are plate valves 29 and 31. These valves are so arranged that when both of them are in the position shown in FIG. 5 the stream of cotton entering the housings from the lint flue 10 divides equally as shown by the arrows, and substantially half of it is treated by the lint cleaner A and the other half by the lint cleaner B as shown.

I have found that a more uniform distribution or equal division of the material into the housing laterals 14 from duct 10 may be obtained by providing a slot 32 in the side wall. By means of an adjustable valve 33 the amount of air drawn in through the opening may be regulated, and by so regulating this amount of air the stream of lint in the duct 10 is caused equally to divide between the two lint cleaners.

As illustrated in FIG. 5 it will be apparent that the lint stream entering the duct 10 divides substantially evenly where it is collected on the drums 13 of the condenser, and discharged therefrom by the rollers 16 and 16a as a bat 17 and thence is fed to the saw cylinders 21. Associated with each saw cylinder is a discharge duct 34. Connected to the ducts 34 is a common discharge duct 36. Connected from the righthandmost side of the upper portion of the housings 14 of the condenser for the lint cleaner B is a vertical duct 37. A similar duct 38 connects the exit end of duct 34 with the entrance end of the duct afforded by housing 14 of the condenser for the lint cleaner A.

Pivotally mounted on a shaft 39 is a plate valve 41 for controlling the flow of the lint through the duct 37 and into duct 36. Pivotally mounted on a shaft 42 is another manually operable plate valve 43 which is adapted, under certain conditions, to shut off the duct 34 from the duct 36.

Pivotally mounted on a shaft 44 is a double plate valve 46 which is adapted, in the full line position shown to shut off the back flow of material from duct 34 up the duct 38. Also, the lower portion of valve 46 in the position shown opens duct 34 to duct 36. When valve 46 is turned to the dotted line position it will be seen that communication is established between duct 34 and duct 38, while shutting off communication from duct 34 to duct 36.

As stated in the beginning, it is oftentimes desirable to divide the lint so that one-half of the stream from the flue 10 goes over each of the lint cleaners. When this is done more efficient cleaning of the lint is obtained by reducing the speed of the moving parts, feeding cotton to the saw cylinder at half speed, over what the same would be running if each condenser and each lint cleaner was operating upon the full volume of lint. To this end I provide a speed change mechanism which is illustrated particularly at FIGS. 7 and 8.

To begin with, the saw cylinder shaft 26, being the shaft which is driven by the motor 23 is used to power the entire moving parts. Keyed to the saw cylinder shaft 26 is a multiple sheave 47 having a major diameter part 48 and a minor diameter part 49. The sheave 47 is provided with a boss 51 on which is loosely journaled a sprocket 52. The sprocket 52 has a large diameter section 53 and a smaller diameter section 54. As will be understood the shaft 26 is journaled in end bearings 56 mounted on an end wall 57 of the apparatus.

Also mounted on the end wall 57 is a bearing holder 58. A stub shaft 59 projects outwardly from a bearing 61 mounted in the holder. Keyed to the shaft 59 is a multiple diameter sheave 62. The sheave 62 has a large diameter sheave section 63 and a smaller diameter sheave section 64. As shown, the section 63 cooperates with the small diameter section 49 of sheave 47 whereas the smaller diameter sheave section 64 cooperates with the larger diameter sheave section 48 of sheave 47. Multiple V belts 66 may be selectively placed to run between the sheave parts 49–63 and 48–64. Also, a chain 67 passes over the sprocket 53 and a sprocket 68 keyed to the shaft 59. Therefore, rotation of saw cylinder shaft 26 drives the shaft 59 through the sheave 47. In turn, sprocket 68, through chain 67, drives the large diameter sprocket 53 which is loosely mounted on the hub 51. Power for the upper rotary parts is derived from the sprocket 54 and is transmitted upwardly by a chain 69 passing around a sprocket 71 fast on the shaft 72 of the lowermost feed works roll 18. In a manner well understood, the upper feed works roll 18 is driven in the direction shown from the opposite end of shaft 72.

A second chain 73 passes around a sprocket 74 made fast with sprocket 71 and thereby likewise driven by chain 69 and passes over another sprocket 76 fast on the shaft 77 of the doffing roll 16a. The doffing roll 16 is driven in the direction shown from the opposite end of shaft 77 in a manner well understood.

Also driven by the chain 73 along with sprocket 76 is another sprocket 78 around which passes a chain 79. The chain 79 passes over a sprocket 81 fast on the shaft 82 of the condenser drum thereby to rotate the condenser. Tension sprockets 83 and 84 and 85 are provided for the chains 73 and 79 and 69, respectively.

The belts 66 are held tight by means of a belt tightening idler 86 mounted on pivoted links 87, the links being operated by a manual handle 88. Thus, the idler 86 holds the belts 61 tight whether or not they are trained over the pulleys 49–63 or 48–64 as will appear. Also, a chain tightener sprocket 89 is provided for the chain 67.

Referring particularly to FIG. 6 of the drawings, it will be apparent that the various plate valves previously described may be provided with manual means for shifting them to their several positions. Thus, valve 33 may be controlled by the linkage mechanism illustrated in FIG. 6 and which terminates in the manually controlled handle 91. Plate valve 29 is controlled manually by a handle 92; valve 31 by a manually movable handle 93; valve 41 by a handle 94; valve 46 by a handle 96; and valve 43 by a handle 97.

From the foregoing it will be seen that with my improved apparatus I can pass the lint cotton from the duct 10 in various ways through the lint cleaners or, can by-pass them altogether.

Referring now to FIG. 1 which is a diagrammatic view showing the lint passing from duct 10 first through the lint cleaner B and then through lint cleaner A and out duct 36, I will describe the position of the various valves to accomplish this flow. In this position valve 31 is raised to the dotted line position shown in FIG. 5, namely, the full line position shown in FIG. 1, and valve 29 is moved to a position to rest against the side of valve 31. Double plate valve 46 is set to a position shown in full lines in FIG. 1, namely, the dotted line position shown in FIG. 5. Valve 43 is the same in FIG. 1 as in FIG. 5. The result of the foregoing setting is that the lint, in an airborne stream, passes from duct 10, into duct 14 of lint cleaner B, is condensed on the associated drum 13, passes to the saw cylinder 21 of lint cleaner B and out of duct 34 up into duct 38, where it enters the inlet 14 of lint cleaner A. The lint is discharged through the duct 34 of lint cleaner A into the common duct 36. The lint thus has made a passage in tandem through the two lint cleaners. Under these conditions of operation the belts 66 would have been transferred from the position shown in FIG. 8 to operate on sheaves 48–64, whereby the condenser and all the feed works of both lint cleaners turn at the maximum speed.

Referring now to FIG. 2 I will illustrate a method of passing the lint from the flue 10 through the righthand unit B only. In this condition the valves 31 and 29 remain the same as described with respect to FIG. 1. The double plate valve 46 is turned to upright position and plate valve 43 is closed so that the suction fan 98 associated with the discharge duct 36 draws air only through the condenser B. In this instance the total stream of lint passes through the cleaner B only, and under these conditions the lint cleaner A may be shut down. Under these conditions the belts 66 are operating on sheaves 48–64.

Referring to FIG. 3 I illustrate an instance in which the lint coming from the lint flue 10 passes only through the lefthand cleaner A, permitting the unit B to be shut down. Under these conditions plate valve 29 is moved to a position to shut off the inlet duct 14 of the cleaner B. Valve 31 remains in the same position as FIG. 1. Valve 41 is now moved to a position to close off the outlet duct 34 of the lint cleaner B and the plate valve is moved to position to establish communication between the vertical ducts 37 and 38. It will be apparent that under this set of conditions the lint from flue 10 passes from that flue downwardly through the conduit 37 and then upwardly through the conduit 38 to enter the lint cleaner A through its inlet section 14 and to discharge therefrom into the outlet conduit 36.

Referring now to FIG. 4 I illustrate a set of conditions for the valves where the lint from the flue 10 by-passes both lint cleaners. In this condition the valves 31 and 29 remain the same as in FIG. 3, valve 41 remains in the same position as in FIG. 3, while valve 46 is moved back to the vertical position and valve 43 is moved to a position to close off the outlet section 34 of lint cleaner A. Therefore, the lint passes from conduit 10 directly down the conduit 37 and directly into the outlet conduit 36. Under these conditions both of the lint cleaners would be de-activated and thus it would make no difference over which pulleys the belts 66 pass.

Referring again to FIG. 5 the condition of the valve shown therein in full lines is that condition wherein, as previously stated, the lint is divided into substantially two equal streams and passes equally over the condenser 13 and the saw cylinders 21 of the two lint cleaners A and B. Under these conditions of operation the low speed drive for the condenser drums 13 and the feed works rolls is obtained by using the belts 66 in the position shown in FIG. 8, namely, passing over sheaves 63–49.

From the foregoing it will be apparent that I have devised an improved system for utilizing, selectively and at will, and in predetermined fashion to suit various customers, a pair of lint cleaners in association with a cotton gin system. For those customers who want the cleanest cotton and are not concerned about a certain amount of fiber damage, I can set the apparatus to pass the cotton in series or in tandem through the two lint cleaners, as illustrated in FIG. 1. Should a foreign object or some mechanical failure cause one of the lint cleaners to be shut down, I can pass the cotton through either one or the other of the lint cleaners as for instance in FIGS. 2 or 3. For those customers who wish maximum cleaning with the least machining of the cotton I can pass the cotton simultaneously in substantially equal amounts through both cleaners, it being remembered that the rate of feed to each lint cleaner in the condition exhibited in FIG. 5 is about one-half the rate of those conditions in the other figures.

Still further, if it is desired to by-pass the cleaners altogether the valve arrangement permits the setting shown in FIG. 4. This would be used where the cotton is hand picked or relatively clean and where the customer desires no machining of the cotton.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In apparatus for cleaning lint cotton and the like,
    (a) a pair of lint cleaners each embodying means to feed lint cotton and a cleaning means to which the cotton is delivered by said feed means,
    (b) a common inlet duct disposed to connect the lint cleaners to a source of supply of lint cotton,
    (c) a common discharge duct for conveying the cotton away from the lint cleaners, and
    (d) valve means associated with said ducts and effective selectively and by predetermined setting of said valves to pass the cotton either:
        (1) through said lint cleaners in tandem; or
        (2) simultaneously from the inlet duct to both of said lint cleaners in substantially equal quantities.

2. Apparatus as defined in claim 1 in which the inlet duct, adjacent the cleaners, is provided with a valved opening in the side thereof whereby atmospheric air may be admitted into said inlet duct, whereby the substantially equal division of lint between the cleaners is assured when the apparatus is operating as set forth in (d) (2) of claim 1.

3. Apparatus as defined in claim 1 in which the feed means of each lint cleaner embodies means to form the cotton into a bat and in which each is provided with means to vary the speed of the feed means, thereby to regulate the thickness of the bat of cotton delivered to the cleaning means and thereby supply said cleaning means with cotton at optimum bat thickness when said valve means is selectively set to operate the cleaners as set forth in (d) (1) and (d) (2) of claim 1.

4. Apparatus as defined in claim 1 in which the feed means is operable to reduce the speed of feed of cotton to the cleaning means when operating as set forth in (d) (2) of claim 1 to approximately one-half the speed of feed when operating as set forth in (d) (1) of claim 1.

5. Apparatus as defined in claim 4 in which the cleaning means comprises saw cylinders onto which the cotton is fed, and means to remove the cotton from the saw cylinders.

6. In apparatus for cleaning lint cotton and the like,
    (a) a pair of lint cleaners each embodying means to feed lint cotton and a cleaning means to which the cotton is delivered by said feed means, (b) a common inlet duct disposed to connect the lint cleaners to a source of supply of cotton,
(c) a common discharge duct for conveying the cotton away from the lint cleaners, and
(d) valve means associated with said ducts and effective selectively and by predetermined settings of said valves to pass the cotton either:
 (1) through said lint cleaners in tandem; or
 (2) through a selected one of said lint cleaners only; or,
 (3) simultaneously from the inlet duct through both of said lint cleaners in substantially equal quantities; or,
 (4) through neither of the lint cleaners, namely, from the inlet duct into said discharge duct.

References Cited
UNITED STATES PATENTS

| | | | |
|---|---|---|---|
| Re. 25,780 | 5/1965 | Brooks | 19—203 |
| 1,182,193 | 5/1916 | Mitchell et al. | 19—36 |
| 2,704,862 | 3/1955 | Moss | 19—205 XR |
| 3,150,417 | 9/1964 | Word | 19—203 |

MERVIN STEIN, *Primary Examiner.*

IRA C. WADDEY, JR., *Assistant Examiner.*